US009313415B2

(12) United States Patent
Schieltz

(10) Patent No.: US 9,313,415 B2
(45) Date of Patent: Apr. 12, 2016

(54) METHOD AND SYSTEM FOR ADJUSTING EXPOSURE SETTINGS OF VIDEO CAMERAS

(71) Applicant: Sensormatic Electronics, LLC, Boca Raton, FL (US)

(72) Inventor: Steven W. Schieltz, Boca Raton, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 14/183,319

(22) Filed: Feb. 18, 2014

(65) Prior Publication Data

US 2014/0232895 A1 Aug. 21, 2014

Related U.S. Application Data

(60) Provisional application No. 61/766,333, filed on Feb. 19, 2013.

(51) Int. Cl.
*H04N 5/235* (2006.01)
*G03B 7/00* (2014.01)
*H04N 5/238* (2006.01)
*H04N 5/232* (2006.01)

(52) U.S. Cl.
CPC .......... *H04N 5/2353* (2013.01); *H04N 5/2352* (2013.01); *H04N 5/2355* (2013.01); *H04N 5/23206* (2013.01); *H04N 5/23216* (2013.01)

(58) Field of Classification Search
None
See application file for complete search history.

(56) References Cited

U.S. PATENT DOCUMENTS

| 5,420,635 | A | 5/1995 | Konishi et al. | |
|---|---|---|---|---|
| 6,621,987 | B1 * | 9/2003 | Tsai et al. | 396/234 |
| 8,218,046 | B1 | 7/2012 | Tashiro | |
| 2003/0099407 | A1 * | 5/2003 | Matsushima | 382/274 |
| 2007/0025683 | A1 * | 2/2007 | Nobori | 385/147 |
| 2007/0104475 | A1 * | 5/2007 | Cheng | G03B 7/08 396/234 |
| 2007/0297753 | A1 * | 12/2007 | Usui et al. | 386/46 |
| 2010/0073516 | A1 * | 3/2010 | Minakuti et al. | 348/229.1 |
| 2012/0113280 | A1 * | 5/2012 | Stupak et al. | 348/208.99 |

FOREIGN PATENT DOCUMENTS

JP 2004120203 A 4/2004

OTHER PUBLICATIONS

International Search Report and Written Opinion of the International Searching Authority, mailed May 15, 2014, from counterpart International Application No. PCT/US2014/016969, filed Feb. 18, 2014.
International Preliminary Report on Patentability, mailed on Jun. 2, 2015, from counterpart International Application No. PCT/US2014/016969, filed on Feb. 18, 2014.

* cited by examiner

*Primary Examiner* — Aung S Moe
*Assistant Examiner* — Euel Cowan
(74) *Attorney, Agent, or Firm* — HoustonHogle, LLP

(57) ABSTRACT

A system and method to enhance dark areas of a scenes while preventing bright areas of the scenes from distorting or skewing exposure settings of video cameras. The video cameras capture images and identify bright areas in the captured images. The video cameras calculate exposure settings while excluding the bright areas in the captured images to enhance the dark areas in the captured images. Camera control parameters are then adjusted based on the calculated exposure settings.

20 Claims, 14 Drawing Sheets

METHOD AND SYSTEM FOR ADJUSTING EXPOSURE SETTINGS OF VIDEO CAMERAS

RELATED APPLICATIONS

This application claims the benefit under 35 USC 119(e) of U.S. Provisional Application No. 61/766,333, filed on Feb. 19, 2013, which is incorporated herein by reference in its entirety.

BACKGROUND OF THE INVENTION

Video surveillance or security cameras are often used for monitoring locations inside or outside of buildings. These buildings include government, residential, and commercial buildings, such as hospitals, casinos, retail establishments (e.g., shopping malls and department stores), offices, or warehouses, to list a few examples. The video cameras typically capture video data as a series of images (or frames) and send the video data to a control system, workstation, and/or network video recorder (NVR). The video data may be monitored in real time by security personnel or stored in the network video recorder and viewed at a later time.

Wide dynamic range (WDR) cameras are often used in security systems because the video cameras many times operate in locations with varying lighting conditions and must image objects of widely different intensities. Dynamic range refers to the ratio between the maximum and minimum measurable light intensities. For example, video cameras installed to monitor a parking lot at night will see bright headlights and area/street lights and dark shadows at the edges.

Currently, wide dynamic range (WDR) cameras utilize a number of different technologies. For example, some WDR video cameras implement multi-frame imaging. In this method, the video cameras capture multiple images of the same scene with different exposure settings (e.g., iris setting and shutter speed). The different images are then combined into one image. Other cameras use logarithmic sensors, which have different sensitivity at different intensity levels. Because the logarithmic sensors are less sensitive to changes in bright objects and more sensitive to changes in darker objects, the sensors provide better contrast in the darker parts of a scene.

The video cameras use different automatic exposure modes (metering modes) to calculate the exposure settings for a scene. For example, one metering mode is average metering. In this mode, light from the entire scene is averaged to determine the exposure settings. Conversely, in spot metering, only light from a small focus area (typically 1-5%) or "spot" is used to determine the exposure settings. The light from other areas of the scene is not factored into the exposure settings. Yet another metering mode is center-weighted metering. In this mode, light from a center focus area is weighted significantly more than the light from areas outside of the center area.

Partial metering and multi-zone metering are two additional metering modes. Partial metering is similar to spot metering, but includes a larger focus area (typically 10-15%). Similar to spot metering, light outside of the focus area is not used to determine the exposure settings. Additionally, multi-zone (or matrix) metering uses light from multiple areas in the scene to determine exposure settings.

SUMMARY OF THE INVENTION

One problem with video cameras is that light from bright areas in a scene will typically affect the exposure settings of the video cameras and the bright areas skew the exposure settings. This leads to a loss of detail in the darker areas. However, in many situations, the important objects or details are in those darker areas, especially in security applications. By way of example, while monitoring a parking lot at night, the most important objects from a security standpoint might be located in the shadows. However, these objects are often dimly lit compared to the light sources (e.g., area/street lights or headlights of cars) in the scene. If the exposure settings are calculated based on the small bright areas, the important objects and details (e.g., the people) may be lost in the darker areas of the image.

In general, the present system and method are directed to enhancing the darker areas of scenes and preventing bright areas from distorting or skewing the exposure settings of the video cameras. That is, the present system and method prevent skewing of the exposure settings calculations by very small, but very bright "point" sources that are generally not of particular interest in security applications. These point sources typically include bright light sources such as the sun, light reflections, and/or small windows to the outside in an otherwise dark room, to list a few examples. Additional point sources include headlights or street lights, for example. Enhancing the darker areas and preventing the bright areas from skewing the exposure settings ensures that better detail is provided for darker areas in the captured image.

In more detail, imaging sensors of the video cameras capture video data as a series of images (or frames). Digital signal processors (DSP) of the video cameras segment captured images into window segments and identify bright areas (if any) in the window segments. If the bright areas of the frames cover less than some percentage, e.g., 15 percent of that captured image, then those bright areas are excluded from the exposure settings calculations of the captured image. On the other hand, if the bright areas cover more than 15 percent of that captured image, then the bright areas are factored into the exposure settings calculations.

In general, according to one aspect, the invention features a method for setting exposure of video cameras. The method includes capturing images with the video cameras and identifying bright areas in the captured images. The method further includes calculating exposure settings from the captured images excluding the bright areas in the captured images. Finally, camera control parameters are adjusted based on the calculated exposure settings.

In embodiments, the captured images are segmented into window segments by digital signal processors of the video cameras. The bright areas in the captured images are identified by generating a histogram for each window segment to determine a number of pixels at different light intensity levels for each window segment.

Preferably, the window segments are assigned weighting factors that correspond to automatic exposure modes of the video cameras. The weighting factors include center-weighted, spot, target, region of interest (ROI), average, partial-zone, or multi-zone metering, to list a few examples.

In the preferred embodiment, each captured image is analyzed to determine if the bright areas in the captured image cover less than 15 percent of the captured image. The bright areas are excluded from the exposure settings calculations if the bright areas of that captured image are less than 15 percent of the captured image. Additionally, the bright areas are excluded from the exposure settings calculations when a brightness threshold is exceeded. Typically, the brightness threshold is exceeded when the brightness a threshold that is greater than 50% of the full sampling range. In one example, the threshold is 700 out of a maximum of 1023 of a 10-bit analog to digital converter (ADC).

In the preferred embodiment, the signal processor modifies the calculated exposure settings based on user adjustable compensation parameters and adjusts the camera control parameters based on the modified exposure settings. Typically, the camera control parameters include automatic gain control, shutter speed, and/or iris settings.

In general, according to another aspect, the invention features a video camera. The video camera includes an imaging sensor that captures images and a signal processor that identifies bright areas in the captured images and calculates exposure settings from the captured images excluding the bright areas in the captured images. A processing unit of the video camera adjusts camera control parameters based on the calculated exposure settings.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1A:
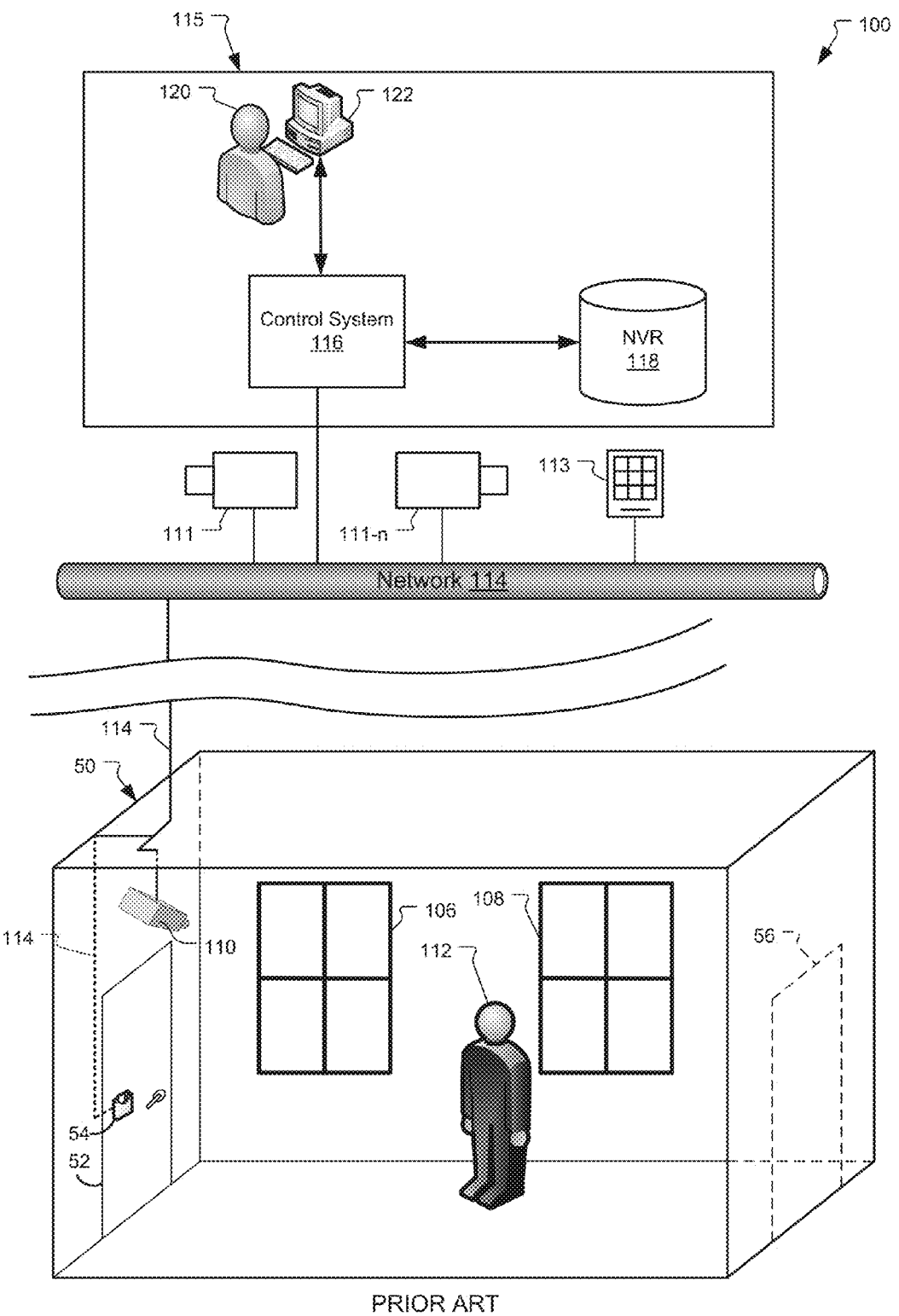
FIG. 1A is a hybrid block diagram and perspective view illustrating a security system that includes security devices.

FIG. 1A is a hybrid block diagram and perspective view illustrating a security system 100 that includes security devices such as video cameras 110, 111-1 to 111-$n$, card readers 54, and touchpad/keypads 113, to list a few examples.

In the illustrated example, a building 50 includes an entry/exit 56 and an access controlled entry/exit 52, which leads to a restricted area. A user validation system such as card reader 54 reads identification badges or keycards of users (e.g., person 112). If the badge is validated, then the access controlled entry/exit 52 is unlocked to enable the person 112 to access the restricted area.

In a typical implementation, the security system 100 includes additional security devices such as keypad/card readers 113, additional video cameras 111-1 to 111-$n$, or motion sensors, for example. The security devices are connected to a network 114, which is typically a public and/or private data network.

The building 50 might include windows 106, 108, which provide light to the interior area of the building 50 depending on the time of day and can thus contribute to the dynamic range of the captured scene.

The video camera 110 monitors a specific area within or outside the building 50. The video camera 110 captures video data as a series of images, which are transferred via the network 114 to a control system 116 in a control room 115. The video camera 110 implements different types of lenses such as fish-eye, wide angle, or panoramic, to list a few examples. Different lenses enable video cameras to capture different fields of view of a scene.

In a typical implementation, the security system 100 further includes a control room 115, which houses the control system 116, a network video recorder (NVR) 118, and a workstation 122.

The control system 116 receives the video data from the video cameras 110, 111 of the security system 100. The video data are transferred to the NVR 116, which stores the video. Typically, time and date information are added to video data to enable the data to be indexed and reviewed at a later date.

The workstation 122 is operated by a user 120. The workstation 122 enables the user 120 to view the video data from the video camera 110.

Figure 1B:
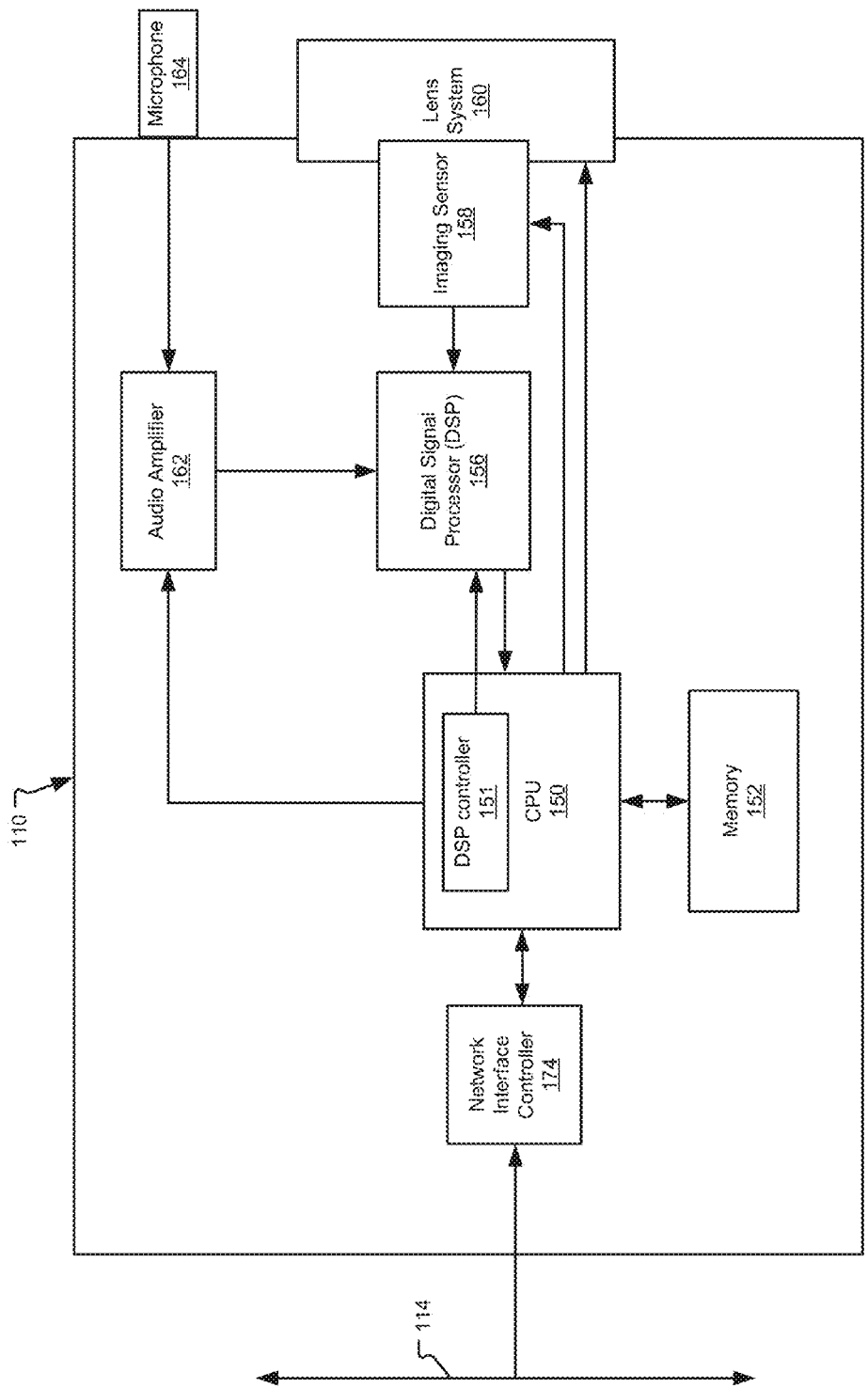
FIG. 1B is a block diagram illustrating components of a video camera.

FIG. 1B is a block diagram illustrating the components of the video camera 110. The video camera 110 includes a camera housing (or enclosure). In terms of electronics, the video camera 100 includes a microprocessor or central processing unit (CPU) 150, which controls the camera control parameters (e.g., shutter speed, automatic gain control, and iris) of the video camera 110. The CPU 150 includes the DSP controller 151, which controls the video processing of the video camera 110 by communicating with the digital signal processor (DSP) 156. The CPU 150 is connected to memory 152, which stores programs used to calculate exposure settings, for example.

The video camera 110 further includes a lens system 160, which typically has one or more lenses, and iris and a focusing mechanism. The lens system 160 captures light and images it onto an imaging sensor 158.

The imaging sensor 158 converts captured light into a series of electronic images (i.e., video data) bases on a shutter setting. Generally, the imaging sensor 158 is a charge-coupled device (CCD) or a complementary metal-oxide-semiconductor (CMOS) device. The imaging sensor 158 is generally installed directly behind the lens system 160 to receive the captured light from the lens system 160.

The video data are sent to the digital signal processor (DSP) 156. The DSP 156 also combines the video data with possibly corresponding audio captured by a microphone 164 and an audio amplifier circuit 162. Additionally, the DSP 156 may compress the audio and video data to make the video data easier to store, analyze, and/or stream over the network 114.

A network interface controller 174 enables the video camera 110 to communicate with the control system 116 over the network 114. The network 114 is typically a public and/or private data network. The network may also include an enterprise network, university network, government network, and/or mobile broadband data network, to list a few examples.

Figure 2A:
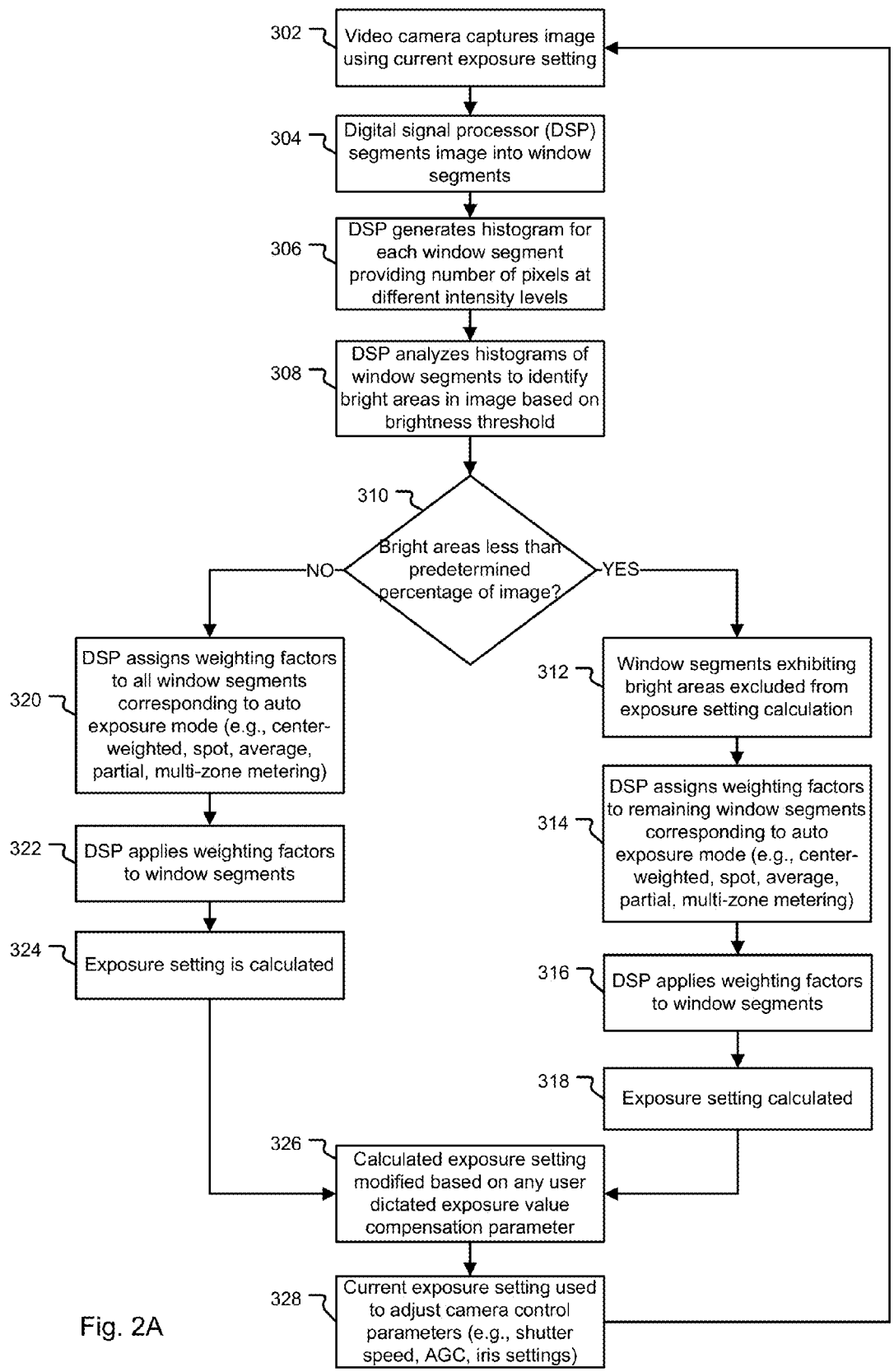
FIG. 2A is a flow diagram illustrating the steps performed by the camera including its digital signal processor to adjust the exposure settings.

FIG. 2A is a flow diagram illustrating the steps performed by the digital signal processor (DSP) 156 to adjust the exposure settings of the video camera 110, such as the iris and/or shutter settings, for example.

In the first step 302, a video camera 110 captures an image using current exposure settings. The digital signal processor (DSP) 156 of the video camera 110 segments the captured image into window segments in step 304.

In the next step 306, the DSP 156 generates a histogram for each window segment to determine the number of pixels at different intensity levels. Then, the DSP analyzes the histograms of the window segments to identify bright areas in the captured image based on a brightness threshold in step 308. In a current embodiment, the brightness threshold greater than 50% of the full range of the sensor 158. Currently, it is about 700 out of 1023 for a 10-bit analog to digital converter (ADC).

The DSP 156 determines if the bright areas of the captured images are less than a predetermined percentage of the captured image in step 310. That is, the number of bright pixels is less than a predetermined percentage of the total number of pixels in the two dimensional array of pixels of the imaging sensor.

If the bright areas of the captured images are less than the predetermined percentage of the captured image, then the window segments exhibiting bright areas are excluded from the exposure setting calculations in step 312. In a current implementation, the predetermined percentage is 5 percent. In general, the predetermined percentage is less than 15 percent, and usually less than 10%.

In the next step 314, the DSP assigns weighting factors to the remaining window segments corresponding to an automatic exposure mode (e.g., center-weighted, spot, target, region of interest (ROI), average, partial, or multi-zone). Then, the DSP 156 applies the weighting factors to the window segments in step 316. The new exposure settings are calculated in step 318. If, however, the bright areas of the captured images are not less than the predetermined percentage of the captured image, then the DSP assigns weighting factors to all window segments, i.e., without exclusion, corresponding to the automatic exposure mode in step 320.

The DSP applies weighting factors to the window segments in step 322 and calculates exposure settings in step 324. In the next step 326, the calculated exposure setting is modified based on any user dictated exposure value compensation parameters. This step enables users to manually adjust the exposure and dynamic range settings of the video camera 110. For example, users that care more about the dark area can increase the exposure settings. Alternatively, users may decrease the exposure settings if they are more concerned with details in the bright areas.

In one current implementation, there are nine different level settings (e.g., levels 0 through 8), which are adjustable through a graphical user interface (GUI). Alternative embodiments, could implement greater or fewer levels. Each level enhances/decreases approximately 4-5 dB in wide dynamic range. Typically, level '0' disables the wide dynamic range of the video camera. The lower WDR range provides increased contrast for a smaller range of image intensities. Alternatively, higher levels improve the image contrast of dark areas for reduced exposure of bright areas. The result is more detail in these dark areas, but with increased noise.

Lastly, in step 328, the current exposure settings are used to adjust camera control parameters (e.g., such as shutter speed, automatic gain control (AGC) and iris settings). Returning to step 302, these camera control parameters and exposure setting are used to capture a subsequent image.

Figure 2B:
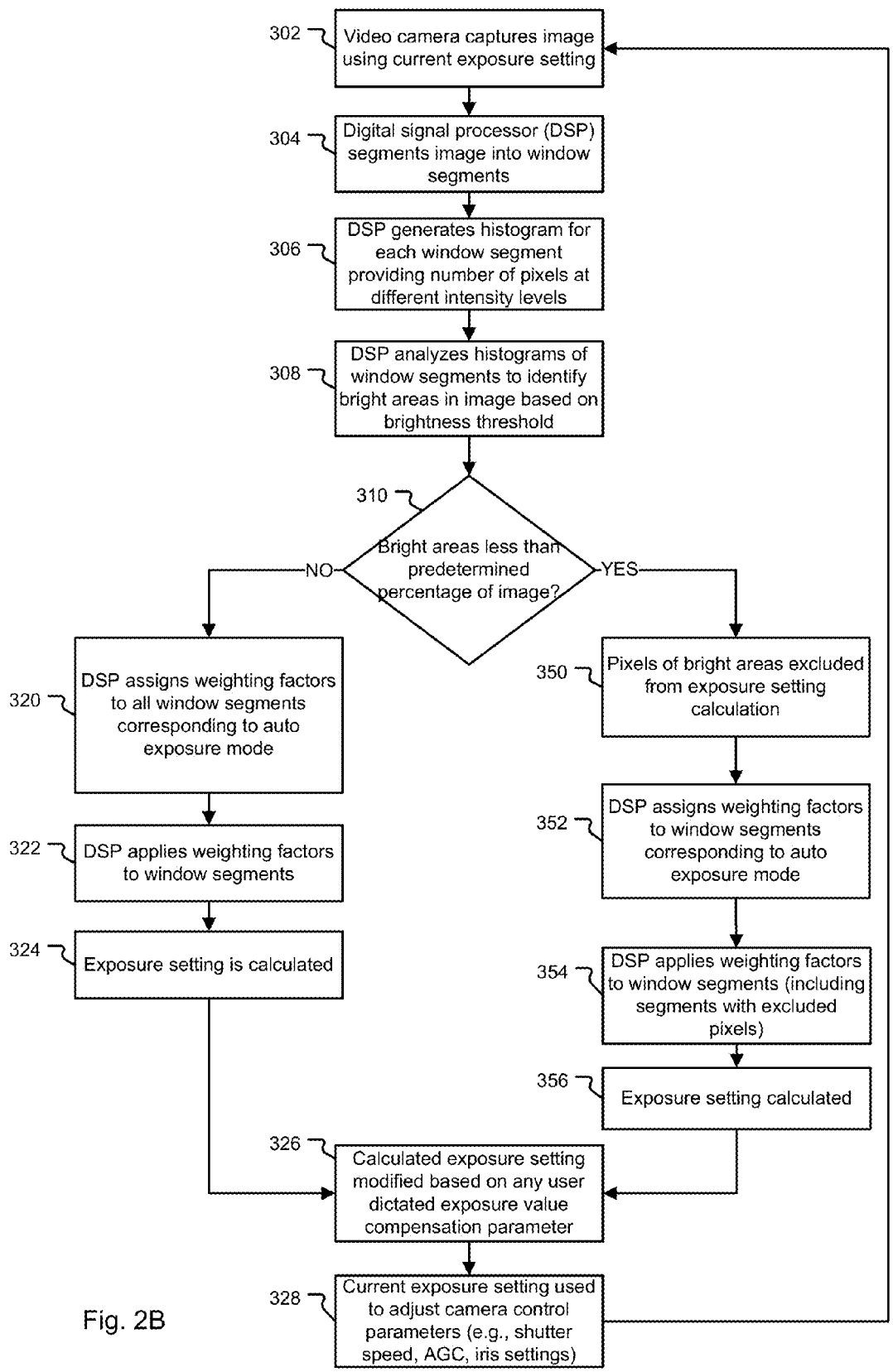
FIG. 2B is a flow diagram of an alternative method performed by the camera to adjust the exposure settings.

FIG. 2B is a flow diagram of an alternative method performed by the digital signal processor 156 to adjust the exposure settings of the video camera 110.

In the previous embodiment described with respect to FIG. 2A, entire window segments were excluded from the exposure settings calculations. In this embodiment, however, only the pixels of bright areas are excluded from the exposure settings calculations.

As shown in FIG. 2B, steps 302-310, and 320-328 are identical to the similarly numbered steps described with respect to FIG. 2A.

If the bright areas of the captured images are less than the predetermined percentage of the captured image (step 310), then the pixels of bright areas are excluded from the exposure settings calculations in step 350. The DSP 156 then assigns weighting factors to the window segments corresponding to the automatic exposure mode in step 352. Then, in step 354, the DSP 156 applies the weighting factors to the window segments (including segments with excluded pixels). In the next step 356, the DSP calculates the exposure settings.

Figure 3A:
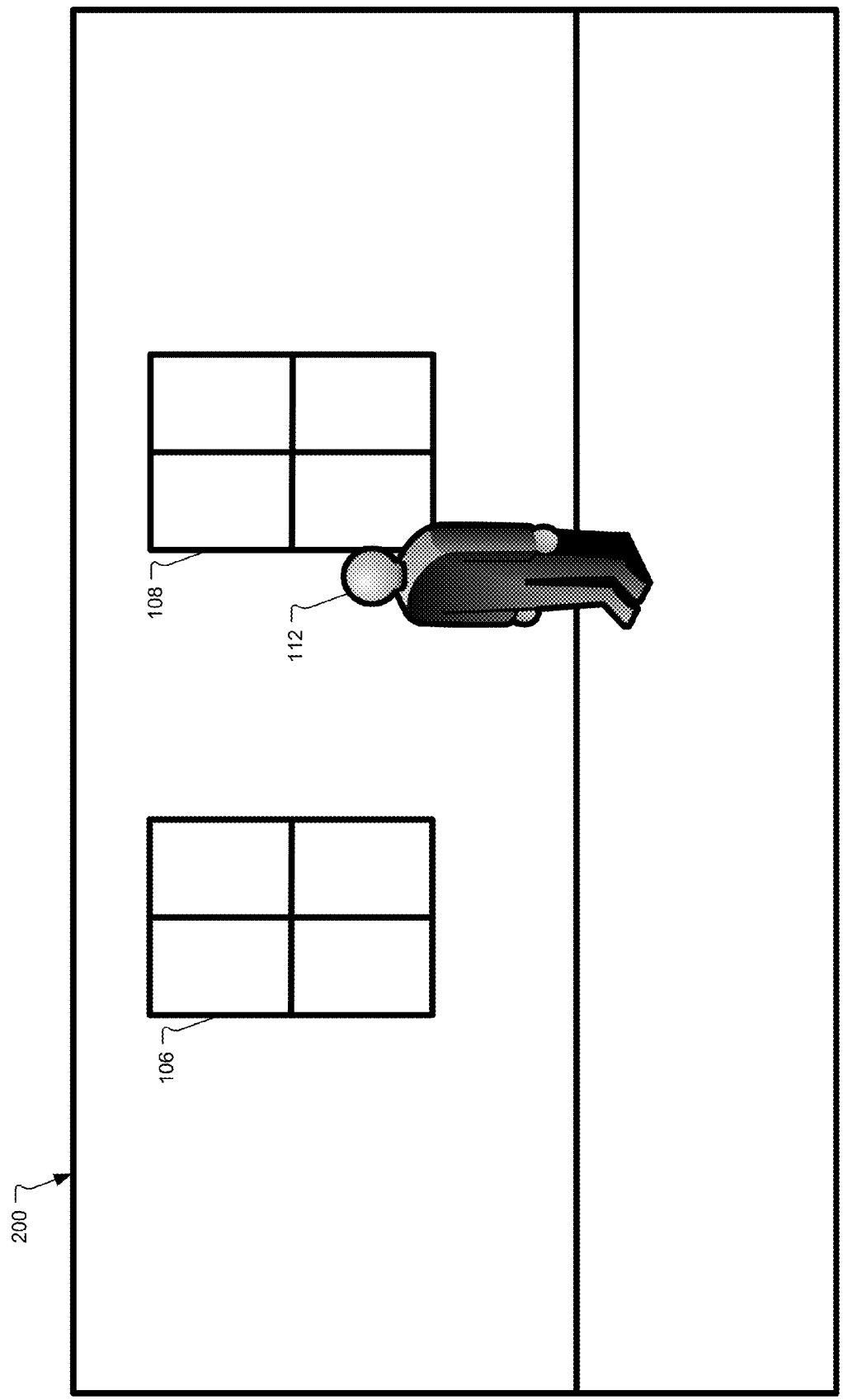
FIG. 3A illustrates an example of an image captured by the video camera.

FIG. 3A illustrates an example of an image 200 captured by the video camera 110 for step 302 of FIGS. 2A and 2B. In the illustrated example, the captured image 200 is of an object (e.g., person 112) in front of windows 106, 108 within the building 50.

Figure 3B:
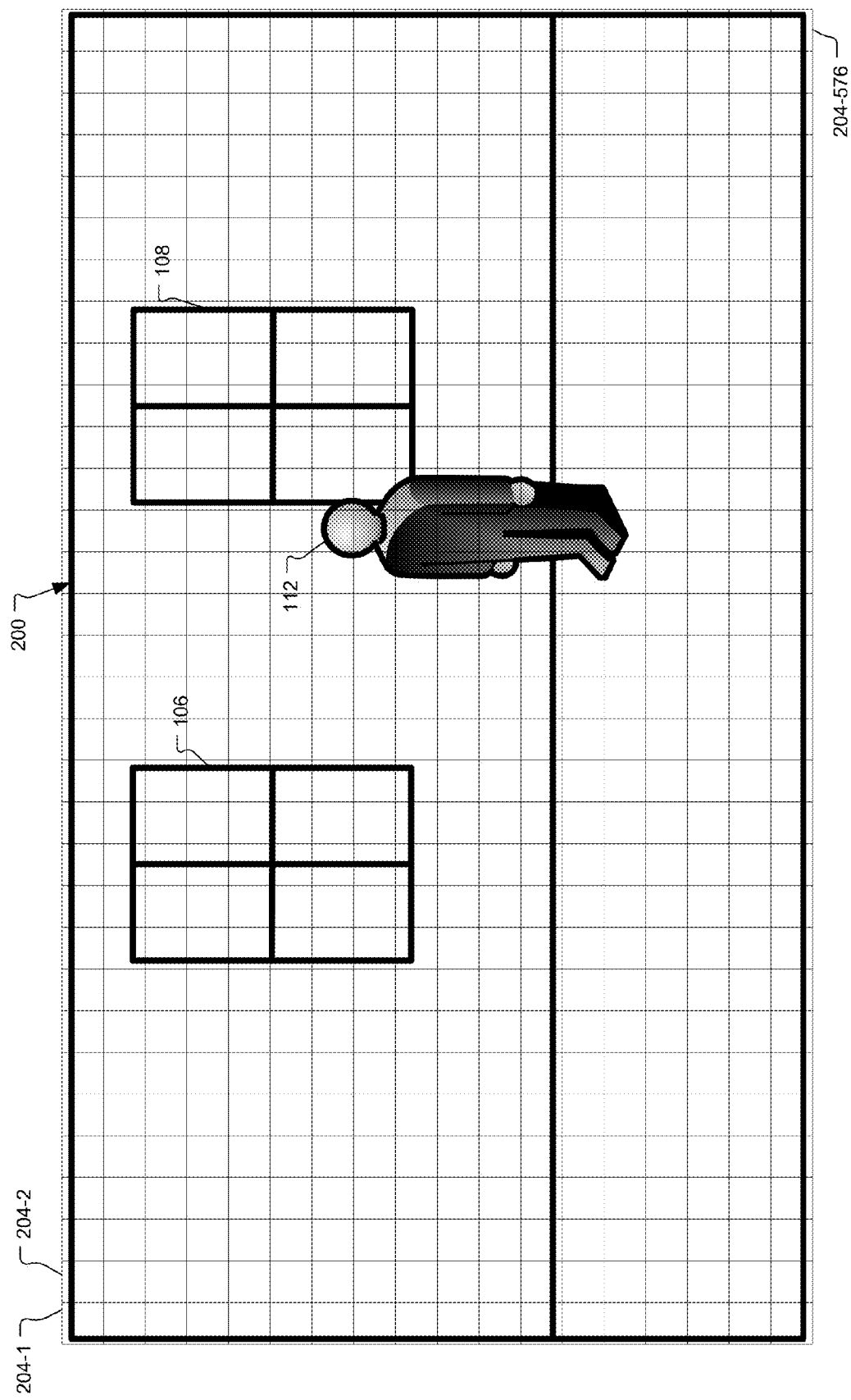
FIG. 3B illustrates how the captured image is segmented into window segments by the digital signal processor of the video camera.

FIG. 3B illustrates how the captured image 200 is segmented into window segments 204-1 through 204-576 by the digital signal processor 156 of the video camera 110 in step 304 of FIGS. 2A and 2B.

In a preferred embodiment, the image is segmented into 32 columns by 18 rows (576 windows segments). In alternative embodiments, however, the captured images may be segmented into greater or fewer row and/or columns.

In the illustrated example, light enters the building 50 via the windows 106, 108. Because the windows cover such a large portion of the scene (e.g., greater than 5 or 15%) as determined in step 310 of FIGS. 2A and 2B, the window segments for these windows 106, 108 will not be excluded in the exposure setting calculations. They will be factored into the exposure settings calculations (e.g., steps 320-324 in FIGS. 2A and 2B).

Figure 3C:
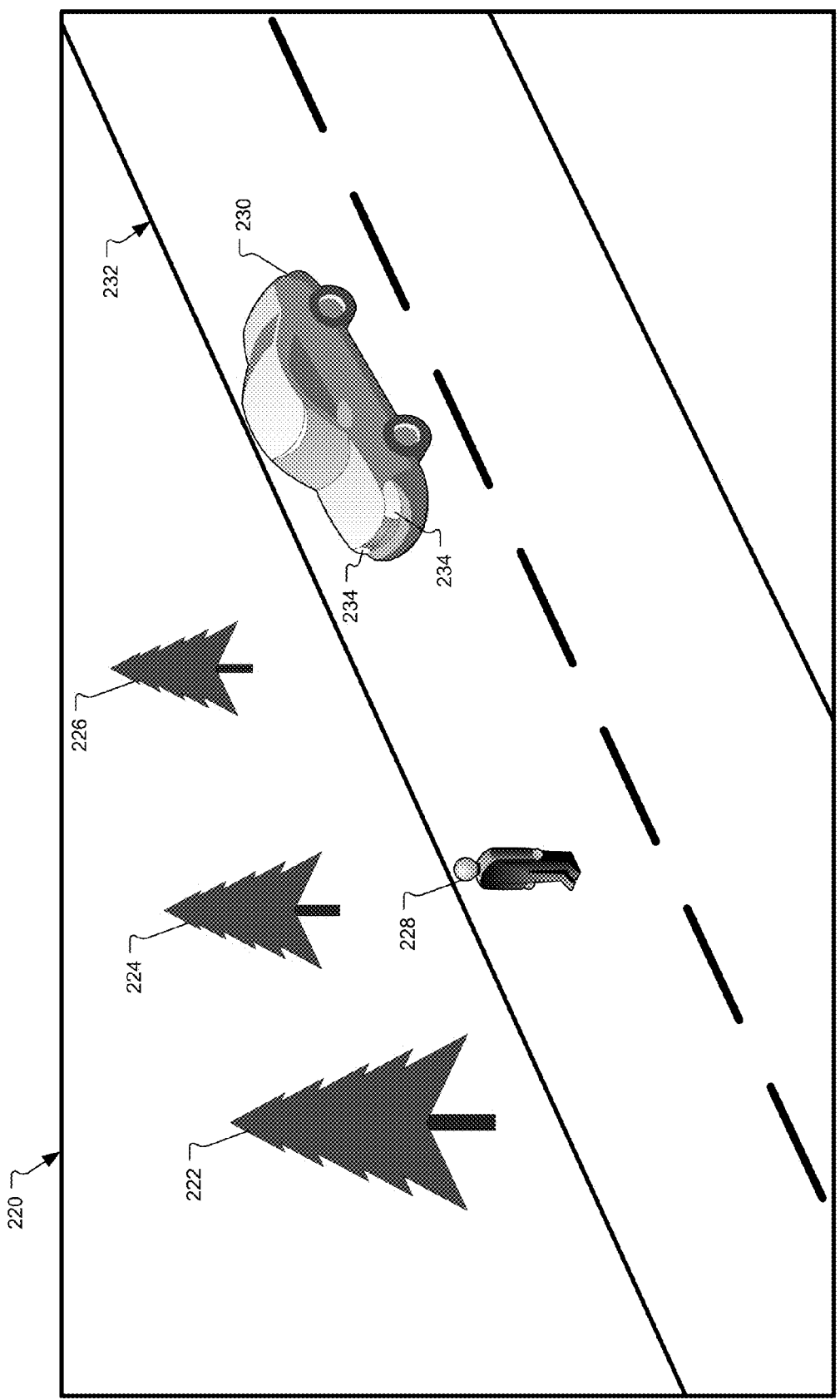
FIG. 3C illustrates an example of an alternative image captured by a video camera.

FIG. 3C illustrates an example of an alternative image 220 captured by an alternative video camera of the security system 100.

In this example, a car 230 is driving on a road 232, possibly at night. A person 228 and trees 222, 224, 226 are different objects of the scene.

Figure 3D:
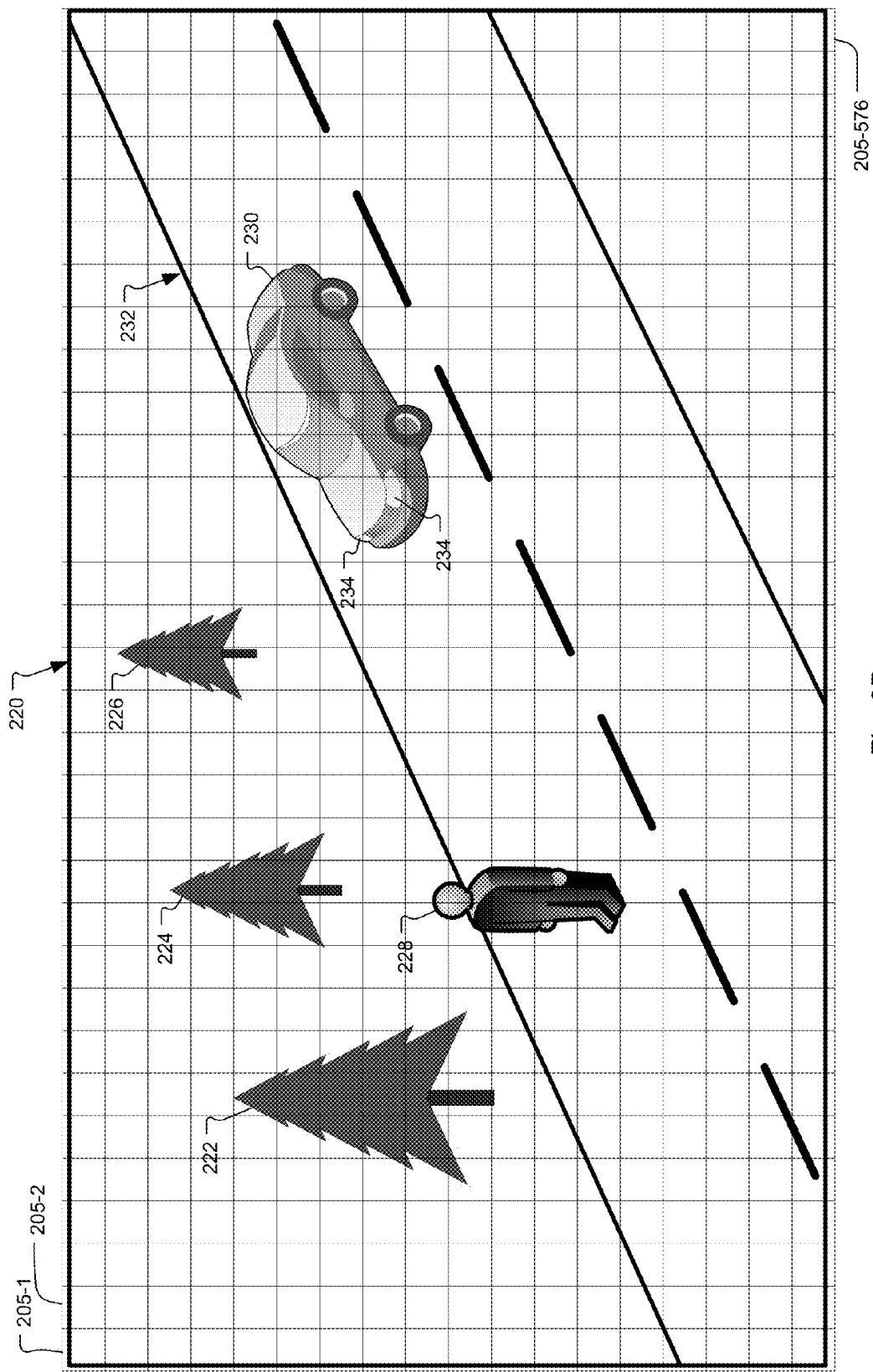
FIG. 3D illustrates how the alternative captured image is segmented into window segments by the digital signal processor.

FIG. 3D illustrates how the alternative image 220 is segmented into window segments 205-1 to 205-576 by a digital signal processor of the video camera according to step 304 of FIGS. 2A and 2B.

Similar to the previous example, the alternative captured image 220 is segmented into 32 columns by 18 rows (576 total windows segments) by a digital signal processor of the video camera.

In this example, headlights 234 provide the light source of the scene. Because the headlights only cover a small portion of the scene, the window segments for the headlights 234 will be excluded in the exposure setting calculations (e.g., steps 312-318 in FIG. 2A). In the alternative embodiment, only the bright pixels (the pixels that detect the light of the headlights 234) of the image 220 are excluded in step 350 of FIG. 2B.

These bright areas are excluded from the exposure settings calculations to prevent the small bright areas from skewing the exposure setting of the image. This helps to ensure that the objects and details in the darker areas are not lost in the captured image.

Figure 3E:
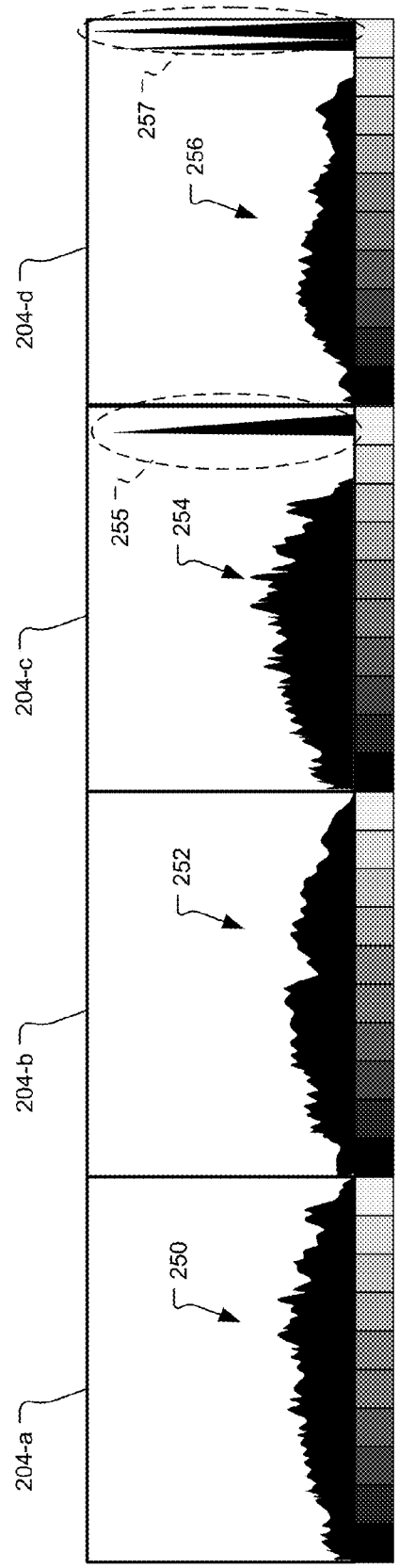
FIG. 3E illustrates how histograms are generated for each window segment of the captured image.

FIG. 3E illustrates example histograms 250-256 for window segments 204-a, 204-b, 204-c, and 204-d, respectively that are generated in step 306 of FIGS. 2A and 2B.

The window segments 204-a and 204-b are of areas of the image that do not include bright areas. Windows segments 204-c and 204-d, in contrast, exhibit spikes (or peaks) 255 and 257, respectively. These spikes 255, 257 are caused by the bright areas in the scene. Thus, these windows segments are excluded in the exposure settings calculations of the exposure settings in the FIG. 2A embodiment. In an alternative FIG. 2B embodiment, only the bright pixels (255, 257) are excluded in the exposure settings calculations.

Figure 4A:
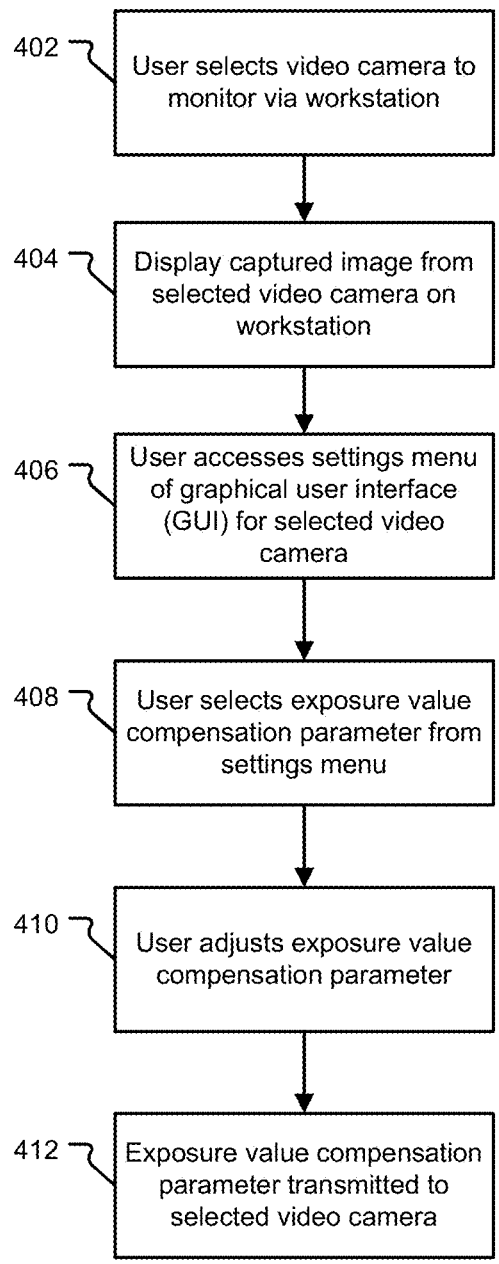
FIG. 4A is a flow diagram that illustrates how users are able to manually adjust exposure settings of the video camera.

FIG. 4A is a flow diagram that illustrates how users are able to manually adjust or compensate exposure settings of the video cameras.

In the first step 402, a user selects a video camera to monitor via the workstation 122. Then, the captured image is displayed from the selected video camera on a display of the workstation 122 in step 404. Next, the user accesses a settings menu of the graphical user interface (GUI) for the selected video camera in step 406.

The user selects an exposure value compensation parameter from the settings menu 502. Then, in step 410, the user is able to adjust the exposure value (EV) compensation parameter. The exposure value compensation parameter is transmitted to the selected video camera in step 412 over the network 114. Next, the video camera 110 adjusts the camera control parameters based on the user adjusted parameter.

Figure 4B:
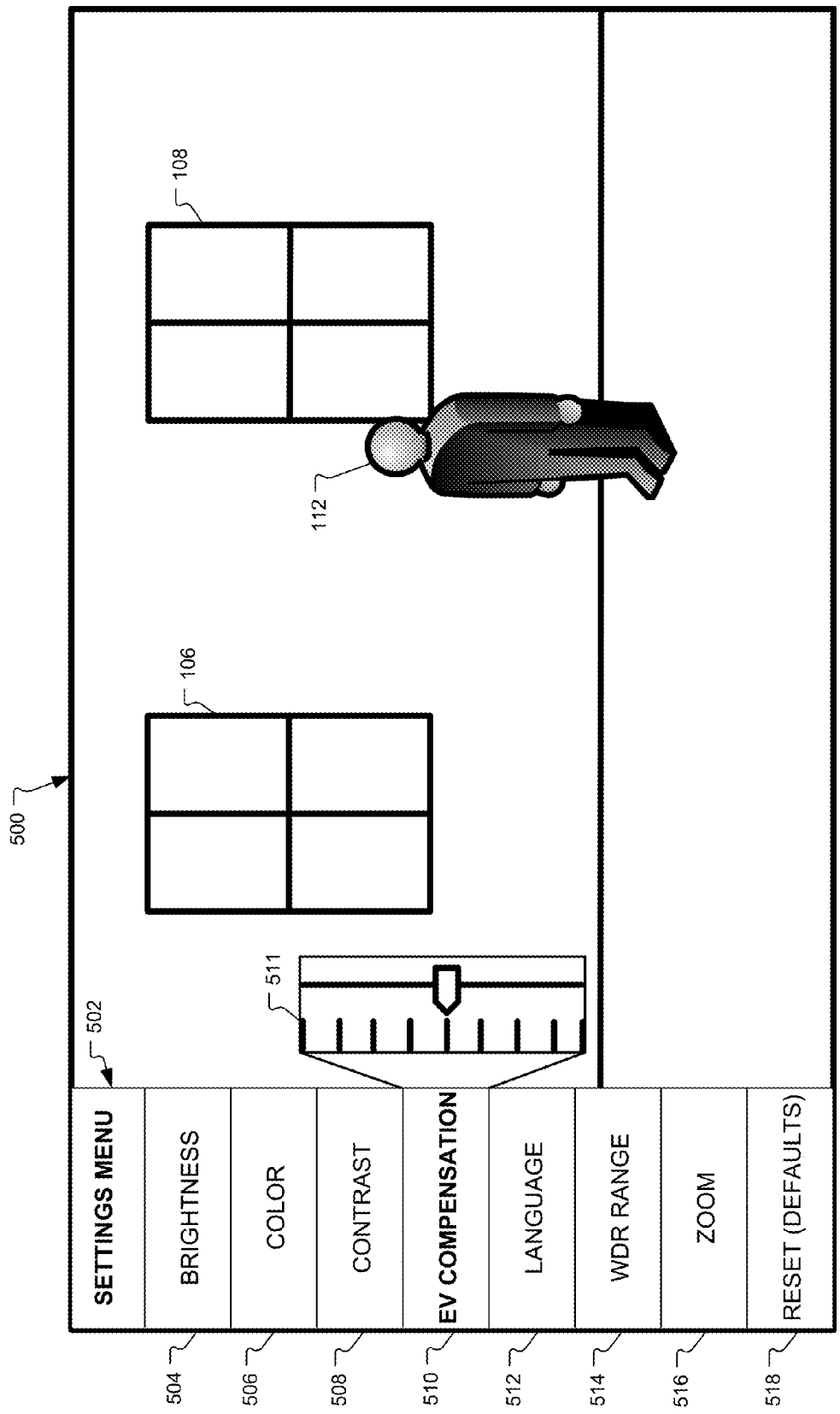
FIG. 4B is an example of a graphical user interface that enables users to manually adjust exposure settings of the video camera.

FIG. 4B is an example of the graphical user interface (GUI) 500 that enables users to manually adjust settings of the video cameras.

The GUI 500 is displayed on the workstation 122. Typically, the GUI 500 is overlaid on the image displayed on the workstation 122. In alternative embodiments, the GUI could be displayed on other devices such tablet computers, laptop computers, or mobile computing devices (e.g., smartphones), to list a few examples.

The user invokes the settings menu 502, which displays user selectable elements 504-518. In the illustrated example, the settings menu 502 includes user selectable elements for brightness 504, color 506, contrast 508, EV (exposure value) compensation 510, language 512, WDR range 514, and zoom 516. Additionally, the GUI 500 further includes a user selectable element 518 to reset any changes back to default settings.

After selecting one of the user selectable elements a slider or other user control is displayed that enables the user to manually adjust the selected setting. In the illustrated example, the user selectable element for the EV compensation 510 is invoked. In response, a slider bar 511 is displayed that enables the user to adjust the level of EV compensation in the image.

Figure 5:
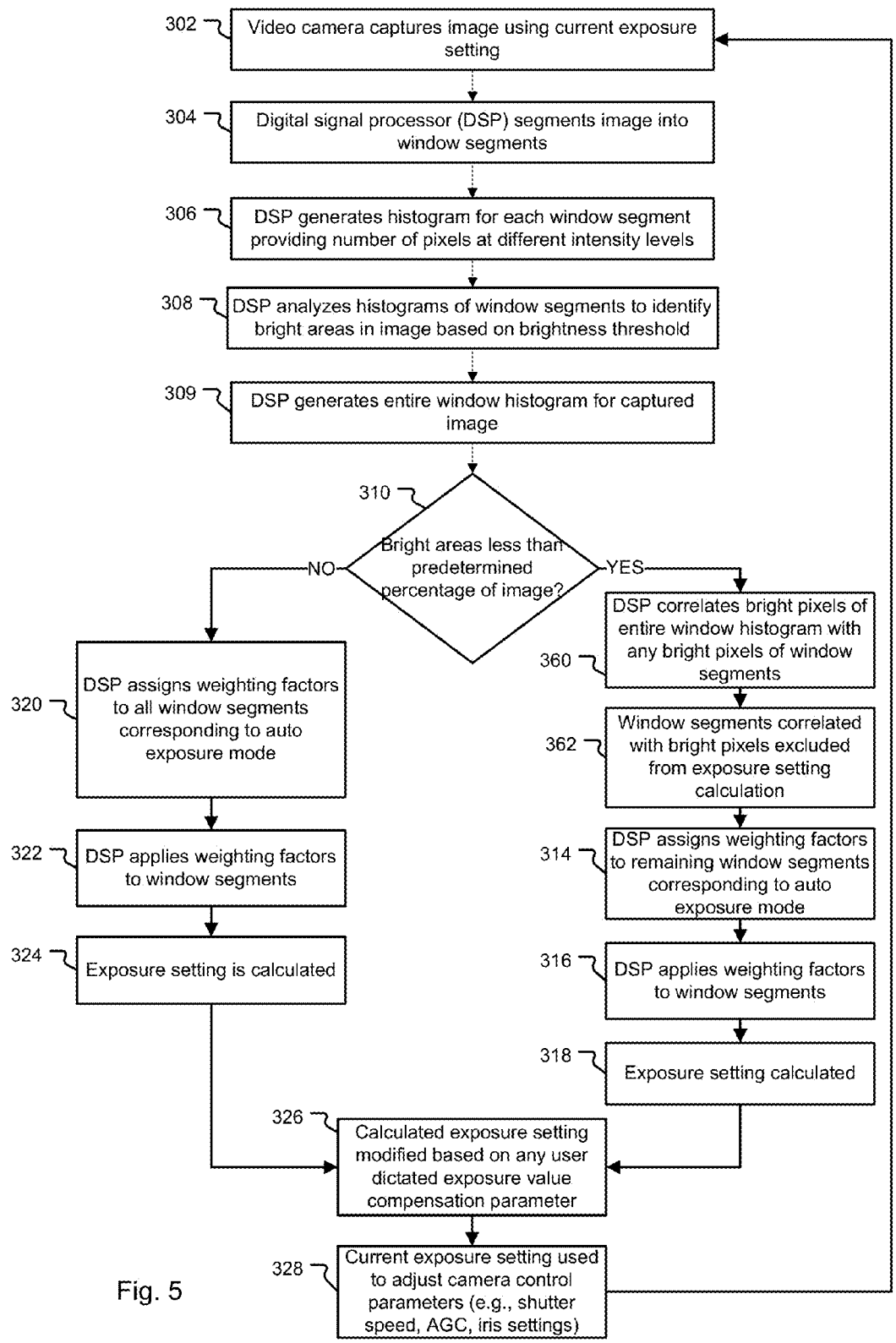
FIG. 5 is a flow diagram illustrating an alternative method to adjust the exposure settings of the video camera by correlating bright pixels of an entire window histogram with bright pixels of the window segments.

FIG. 5 is a flow diagram illustrating alternative steps to adjust the exposure settings of the video camera by correlating bright pixels of an entire window histogram with any bright pixels of the window segments.

In this example, after the DSP 156 analyzes the histograms of window segments to identify bright areas in the captured image based on brightness threshold in step 308, the DSP generates an entire window histogram for the captured image in new step 309.

Then, if the areas of the captured images are less than the predetermined percentage of the captured image (step 310), the DSP 156 correlates the bright pixels of the entire window histogram with any bright pixels of the window segments in step 360. Next, the window segments correlated with bright pixels are excluded from exposure setting calculations in step 362.

Figure 6A:
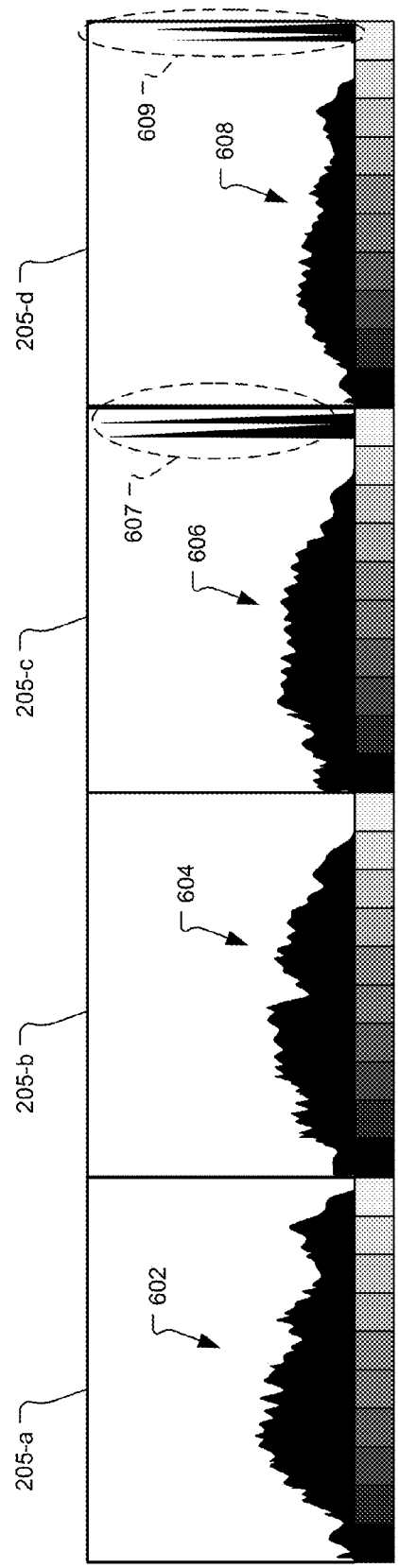
FIG. 6A illustrates how histograms are generated for each window segment of the captured image.

FIG. 6A illustrates histograms 602-608 for window segments 205-a, 205-b, 205-c, and 205-d, respectively.

Window segments 205-a and 205-b illustrate areas that do not include bright areas. Conversely, windows segments 205-c and 205-d include spikes 607 and 609, respectively. These spikes 607, 609 are caused by bright areas in the scenes (e.g., headlights, sun, reflections, street lights).

Figure 6B:
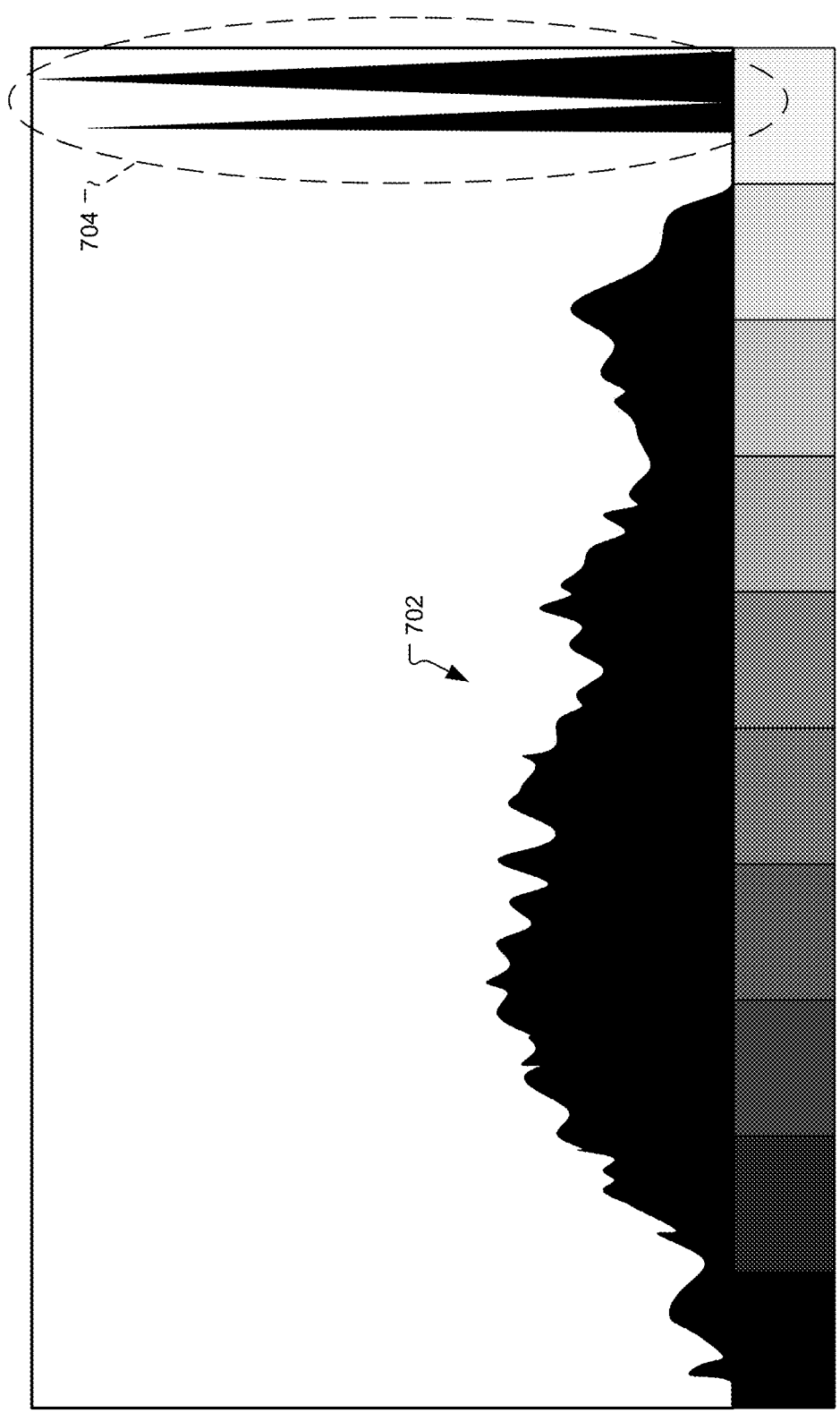
FIG. 6B illustrates an example of an entire window histogram for a captured image.

FIG. 6B illustrates an example of a histogram 702 of a captured image, which includes spikes (or peaks) 704. These spikes 704 indicate at least one bright area in the captured image. The DSP of the video camera correlates the bright pixels 704 of entire window histogram 702 with any bright pixels of window segments. See pixels 607 and 609 of segments 205-c and 205-d, respectively, in FIG. 6A, leading to these segments being excluded from the exposure setting calculation.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for setting exposure of video cameras, the method comprising:

capturing images with the video cameras;
identifying bright areas in the captured images;
calculating exposure settings from the captured images excluding the bright areas in the captured images; and
adjusting camera control parameters based on the calculated exposure settings; and
wherein the captured images are individually analyzed to determine the bright areas in each captured image, the bright areas being excluded from the exposure settings calculations if the bright areas in the captured image are less than a predetermined percentage of the captured image.

2. The method according to claim 1, wherein the bright areas are identified in segments of the captured images.

3. The method according to claim 2, wherein the bright areas are excluded from the exposure settings calculations if a brightness threshold is exceeded.

4. The method according to claim 2, further comprising segmenting the captured images into window segments by signal processors of the video cameras and excluding window segments containing or pixels of the bright areas from the calculation of the exposure settings.

5. The method according to claim 4, wherein the bright areas in the captured images are identified by generating a histogram for each window segment to determine a number of pixels at different light intensity levels for each window segment.

6. The method according to claim 4, wherein the window segments are assigned weighting factors that correspond to automatic exposure modes of the video cameras.

7. The method according to claim 6, wherein the automatic exposure modes include center-weighted, spot, target, region of interest (ROI), average, partial-zone, or multi-zone.

8. The method according to claim 1, wherein the camera control parameters include automatic gain control, shutter speed, and/or iris settings.

9. The method according to claim 1, further comprising modifying the exposure settings in response to user adjustable compensation parameters and adjusting camera control parameters based on the modified exposure settings.

10. A method for setting exposure of video cameras, the method comprising:
capturing images with the video cameras;
identifying bright areas in the captured images;
calculating exposure settings from the captured images excluding the bright areas in the captured images; and
adjusting camera control parameters based on the calculated exposure settings; and
wherein the captured images are individually analyzed to determine the bright areas in each captured image, the bright areas being excluded from the exposure settings calculations if the bright areas in the captured image are less than 15 percent of the captured image.

11. A method for setting exposure of video cameras, the method comprising:
capturing images with the video cameras;
identifying bright areas in the captured images;
calculating exposure settings from the captured images excluding the bright areas in the captured images; and
adjusting camera control parameters based on the calculated exposure settings; and
wherein the bright areas are excluded from the exposure settings calculations if a brightness threshold is exceeded, the brightness threshold being greater than 50% of the full sampling range.

12. A video camera comprising:
an imaging sensor that captures images;
a signal processor that identifies bright areas in the captured images and calculates exposure settings from the captured images excluding the bright areas in the captured images; and
a processing unit that adjusts camera control parameters based on the calculated exposure settings; and
wherein the captured images are individually analyzed to determine the bright areas in each captured image, the bright areas being excluded from the exposure settings calculations if the bright areas in the captured image are less than 15 percent of the captured image.

13. The camera according to claim 12, wherein the bright areas are excluded from the exposure settings calculations if a brightness threshold is exceeded.

14. A video camera comprising:
an imaging sensor that captures images;
a signal processor that identifies bright areas in the captured images and calculates exposure settings from the captured images excluding the bright areas in the captured images; and
a processing unit that adjusts camera control parameters based on the calculated exposure settings; and
wherein the bright areas are excluded from the exposure settings calculations if a brightness threshold is exceeded, the brightness threshold being greater than 50% of the full sampling range.

15. The camera according to claim 14, wherein the signal processor segments the captured images into window segments and excludes the window segments containing or pixels of the bright areas from the calculation of the exposure settings.

16. The camera according to claim 15, wherein signal processor identifies the bright areas in the captured images by generating a histogram for each window segment to provide a number of pixels at different light intensity levels for each window segment.

17. The camera according to claim 15, wherein the window segments are assigned weighting factors that correspond to automatic exposure modes of the video cameras.

18. The camera according to claim 17, wherein the automatic exposure modes include center-weighted, spot, target, region of interest (ROI), average, partial-zone, or multi-zone.

19. The camera according to claim 14, wherein the camera control parameters include automatic gain control, shutter speed, and/or iris settings.

20. The camera according to claim 14, wherein the signal processor modifies the exposure settings in response to user adjustable compensation parameters and adjusts the camera control parameters based on the modified exposure settings.

* * * * *